May 6, 1924.

F. C. BLANCHARD 1,492,955

VALVE HANDLE CONSTRUCTION

Filed Feb. 5, 1921

Inventor
Frederick C. Blanchard

By Whittemore Hulbert & Whittemore

Attorneys

Patented May 6, 1924.

1,492,955

UNITED STATES PATENT OFFICE.

FREDERICK C. BLANCHARD, OF DETROIT, MICHIGAN, ASSIGNOR TO DETROIT LUBRICATOR COMPANY, OF DETROIT, MICHIGAN, A CORPORATION OF MICHIGAN.

VALVE-HANDLE CONSTRUCTION.

Application filed February 5, 1921. Serial No. 442,671.

*To all whom it may concern:*

Be it known that I, FREDERICK C. BLANCHARD, a citizen of the United States of America, residing at Detroit, in the county of Wayne and State of Michigan, have invented certain new and useful Improvements in Valve-Handle Construction, of which the following is a specification, reference being had therein to the accompanying drawings.

In the construction of valves for the use in steam lines and the like, it is usual to provide hand-holds that are of heat insulating material.

This invention relates to a handle construction for valves that is heat insulated, while the material thereof may be metallic, the use of wood, glass, porcelain or the like being avoided.

The invention consists in the matters hereinafter set forth and more particularly pointed out in the appended claims.

Figure 1:
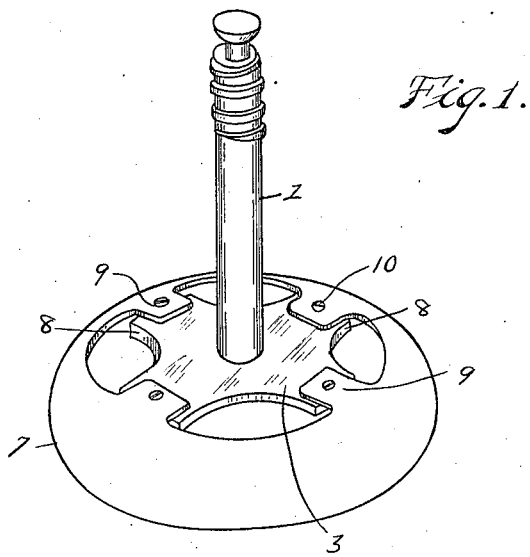
Figure 1 is a view in perspective of a valve handle embodying features of the invention.
Figure 2:
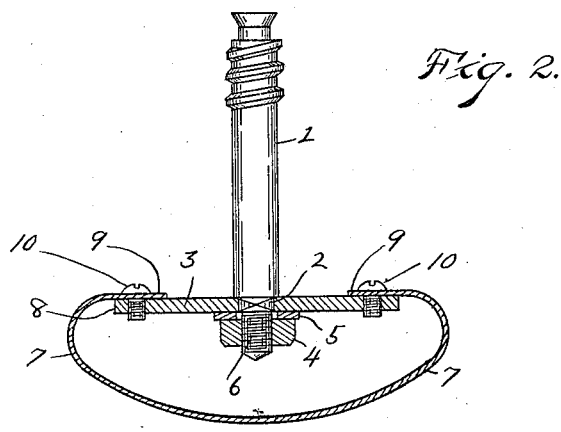
Figure 2 is a view, partially in longitudinal section and partially in elevation, thereof.

As herein shown in preferred form a stem 1 that is fitted at one end to operate the valve mechanism, has a smaller squared polygonal or flattened portion 2 on which a spider 3 of sheet metal or the like, is non-rotatably secured as by a nut 4 and interposed washer 5, the nut engaging a screw-threaded portion 6 of the stem.

A hand-hold 7 of the desired contour, is formed of sheet or cast metal with a hollow body and an opening on the inner face through which the spider may be inserted and turned so that arms 8 thereof are in underlying relation to lugs 9 formed on the hand-hold, screws 10 or the like holding the parts together. The hand-hold is preferably stamped from sheet metal or otherwise formed up as desired.

As a result of this construction, a handle is obtained that is insulated from heat by the air space and openings between the spider and hollow body of the knob that is adapted to resist hard usage, that is pleasing in appearance and is formed of materials that are easily machined and inexpensive.

Obviously, changes in the details of construction may be made without departing from the spirit of the invention, and I do not care to limit myself to any particular form or arrangement of parts.

What I claim as my invention is:

1. A handle for valves comprising a stem, a hollow hand-hold having an opening in its inner face provided with inwardly extending lugs, a spider on the stem adapted to span the opening, and means for detachably securing the spider to the lugs.

2. A handle for valves comprising a stem, a spider non-rotatably secured to the stem, and a hollow hand-hold having an opening in the inner face thereof to which the spider is secured, the spider and hand-hold being arranged to provide air openings between the same.

3. A handle for valves comprising a hollow, sheet metal body forming a hand-hold and having an opening into the interior through the inner wall with lugs extending inwardly from the margins of the opening, a spider spanning the opening with arms that register with and are secured to the lugs, a stem, and means securing the spider non-rotatably on the stem.

4. A handle for valves comprising a hollow hand hold or knob of sheet material with opening into the interior through the inner wall thereof, lugs on the hand-hold extending inwardly over the opening, a spider having arms adapted to be inserted through the opening and twined into register with the lugs, means for detachably securing the arms and lugs together and a stem on which the spider is non-rotatably secured.

5. A handle for valves comprising a hollow hand-hold having an outer and laterally extending imperforate portion and an opening in its inner face, a stem, a spider mounted upon said stem and adapted to be inserted through the opening in said hand-hold, and means for securing said spider and hand-hold together.

6. A handle for valves comprising a stem, a hollow imperforate hand-hold of sheet material having an opening on the inner face and a member spanning the opening and securing the stem and hand hold together, the connection between said hand-hold and member being such as to provide a ventilating aperture therebetween.

7. A handle for valves comprising a stem, a hollow hand-hold having an opening in one side only and a detachable member spanning the opening and securing the stem and hand hold together, the connection between said hand-hold and member being such as to provide a ventilating aperture therebetween.

8. A handle for valves comprising a stem, a hollow metallic hand-hold having an opening in one side thereof, a spider mounted on the stem and adapted to be inserted in the opening in said hand-hold, and means for securing the spider to the hand-hold.

In testimony whereof I affix my signature.

FREDERICK C. BLANCHARD.